(12) United States Patent
Wang et al.

(10) Patent No.: US 9,516,267 B2
(45) Date of Patent: Dec. 6, 2016

(54) REMOTE MAGNIFICATION AND OPTIMIZATION OF SHARED CONTENT IN ONLINE MEETING

(71) Applicant: Cisco Technology, Inc., San Jose, CA (US)

(72) Inventors: Changjiang Wang, Jiangsu (CN); Huahua Yin, Jiangsu (CN); Weifeng Shi, Jiangsu (CN)

(73) Assignee: Cisco Technology, Inc., San Jose, CA (US)

( * ) Notice: Subject to any disclaimer, the term of this patent is extended or adjusted under 35 U.S.C. 154(b) by 156 days.

(21) Appl. No.: 14/482,037

(22) Filed: Sep. 10, 2014

(65) Prior Publication Data
US 2016/0073052 A1   Mar. 10, 2016

(51) Int. Cl.
*H04N 7/14* (2006.01)
*H04L 29/06* (2006.01)
*H04N 7/15* (2006.01)

(52) U.S. Cl.
CPC ............ *H04N 7/142* (2013.01); *H04L 65/604* (2013.01); *H04N 7/15* (2013.01)

(58) Field of Classification Search
CPC ........................................................ H04N 7/14
USPC .................... 348/14.01, 14.03, 14.07, 14.12, 14.09, 348/14.08, 14.14
See application file for complete search history.

(56) References Cited

U.S. PATENT DOCUMENTS

| 6,924,822 B2 | 8/2005 | Card et al. |
| 8,185,828 B2 | 5/2012 | Liu et al. |
| 2014/0125755 A1* | 5/2014 | Thomas ................ H04L 65/403 348/14.03 |
| 2015/0033146 A1* | 1/2015 | Wu ...................... H04L 65/1096 715/753 |
| 2015/0052200 A1* | 2/2015 | Ouyang ............ G06F 15/17306 709/204 |
| 2015/0128069 A1* | 5/2015 | Ouyang ................ H04L 65/605 715/753 |

OTHER PUBLICATIONS

Freedom Scientific, Inc., MAGic® Quick Start Guide, retrieved from http://www.freedomscientific.com/products/low-vision/MAGic-screen-magnification-software.asp, on Aug. 19, 2013, 38 pages.
Freedom Scientific, Inc., MAGic® Screen Magnification Software Flyer, retrieved from http://www.freedomscientific.com/products/low-vision/MAGic-screen-magnification-software.asp, on Aug. 19, 2013, 2 pages.

* cited by examiner

*Primary Examiner* — Olisa Anwah
(74) *Attorney, Agent, or Firm* — Edell, Shapiro & Finnan, LLC

(57) ABSTRACT

Presented herein are techniques to improve content sharing in online conference meetings/sessions. A first request is received from a first attendee device participating in an online meeting. The first request includes information indicating/describing a first particular region of shared content being presented by a presenter device during the online meeting, to be magnified at the first attendee device. Magnified image data for the first particular region is generated from uncompressed image data for the shared content based on the information contained in the first request. The magnified image data for the first particular region is sent for display at the first attendee device.

24 Claims, 12 Drawing Sheets

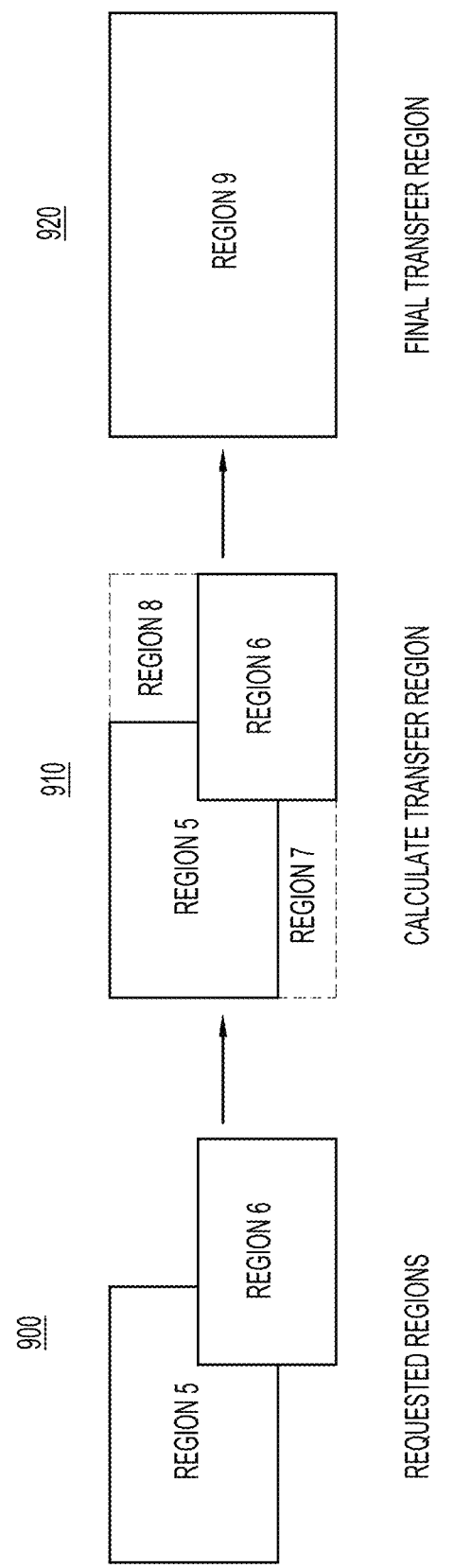

REMOTE MAGNIFICATION AND OPTIMIZATION OF SHARED CONTENT IN ONLINE MEETING

TECHNICAL FIELD

The present disclosure relates to shared content in on-line conference sessions.

BACKGROUND

In online conference sessions/meetings, sharing application or desktop content is a common feature. When the person sharing the content (called the presenter) starts sharing, the shared content is captured and compressed as image data and sent to a meeting server. The meeting server then sends that compressed data to the other devices participating in the meeting, called the attendees. Often the shared content may be too small to enable attendees to read it on their devices.

BRIEF DESCRIPTION OF THE DRAWINGS

FIG. 9 is a diagram depicting an operational flow for generating magnified image data for each of multiple regions that partially overlap with each other, according to an example embodiment.

DESCRIPTION OF EXAMPLE EMBODIMENTS

Overview

Presented herein are techniques to improve content sharing in online conference meetings/sessions. A first request is received from a first attendee device participating in an online meeting. The first request includes information indicating/describing a first particular region of shared content being presented by a presenter device during the online meeting, to be magnified at the first attendee device. Magnified image data for the first particular region is generated from uncompressed image data for the shared content based on the information contained in the first request. The magnified image data for the first particular region is sent for display at the first attendee device.

Example Embodiments

Figure 1:
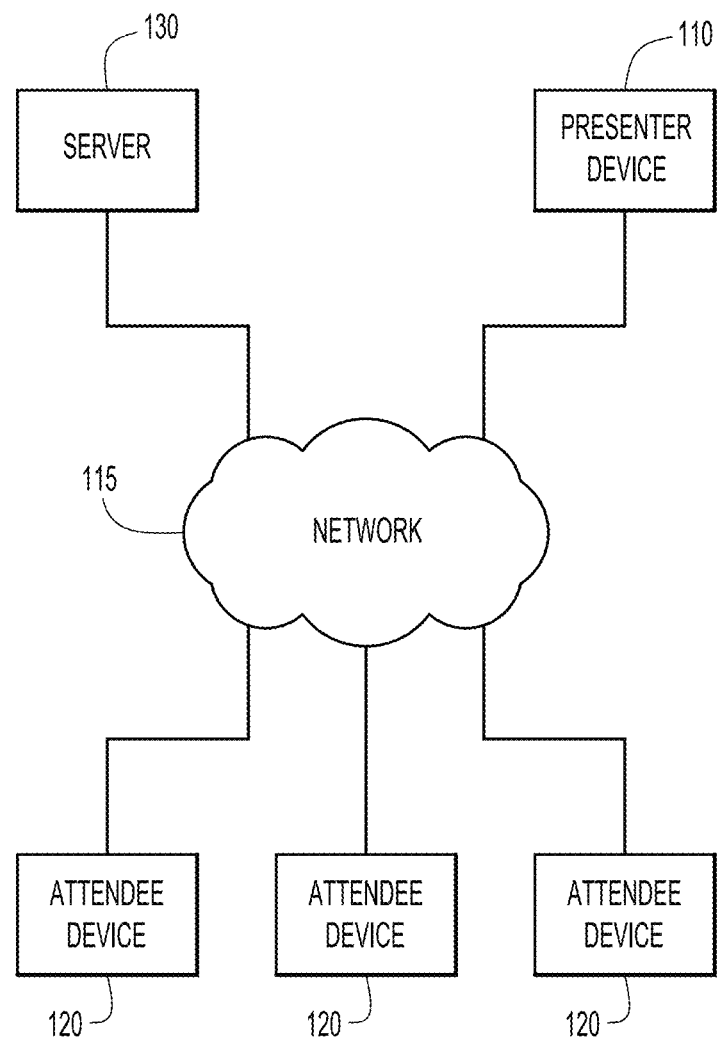
FIG. 1 is a block diagram of an example system in which computing devices are connected to facilitate a conference session between the devices, including content sharing from one device to one or more other devices, and in which region magnification can be requested by an attendee device according to an example embodiment.

FIG. 1 depicts a block diagram of an example system 100 that facilitates conference sessions between two or more computing devices, where a conference session may include sharing of desktop or application content displayed by one computing device with other computing devices of the system. A conference session can be any suitable communication session (e.g., instant messaging, video conferencing, web or other on-line conferencing/meeting, remote log-in and control of one computing device by another computing device, etc.) in which audio, video, document, screen image and/or any other type of content is shared between two or more computing devices. Shared content may include a desktop sharing, in which a computing device shares its desktop content (e.g., open documents, video content, images and/or any other content that is currently displayed by the computing device sharing the content) with other computing devices, or application sharing in which only content associated with one or more applications is shared in a real-time collaboration session.

System 100 includes a plurality of endpoint devices, including a presenter device 110 and one or more attendee devices 120. The endpoint devices may communicate with each other and/or one or more servers 130 (called a meeting server(s)) over network 115. A single server 130 is shown for simplicity. The endpoint devices may take a variety of forms, including a desktop computer, laptop computer, mobile/cellular phone, tablet computer, etc. Network 115 may include one or more wired and/or wireless local and/or wide area networks. Presenter device 110 is an endpoint device from which content (e.g., a desktop, application, document, etc.) is being shared with meeting attendees at attendee devices 120. Note that at any given time, any endpoint device (e.g., attendee device 120) participating in a conference session may share content and thus operate as a presenter device in the conference session.

As explained further hereinafter, techniques are presented herein to improve the content sharing experience at attendee devices, particularly when the text or other information contained in the shared content is too small to be able to read on a display screen at an attendee device.

While the embodiment of FIG. 1 is described in the context of a client/server system where the server 130 is used to receive content from the presenter device 110 for redistribution to one or more attendee devices 120, it is noted that content sharing and region magnification techniques presented herein are not limited to client/server systems but instead are applicable to any content sharing that can occur between two computing devices (e.g., content sharing directly between two computing devices), i.e., peer-to-peer.

Figure 2:
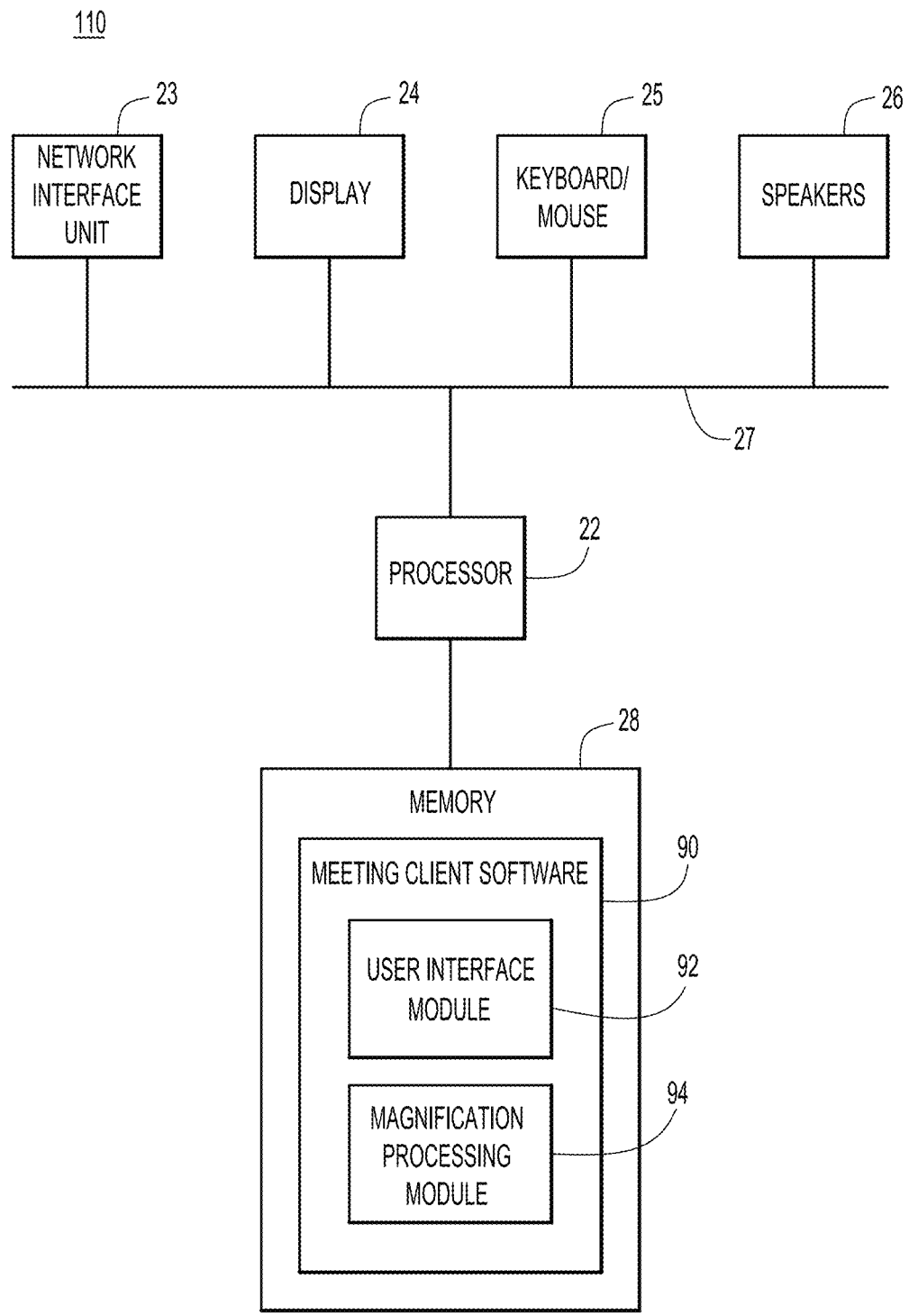
FIG. 2 is a block diagram of an example computing device configured to operate as a presenter device in the system of FIG. 1.

FIG. 2 shows a block diagram of presenter device 110 configured to operate according to the techniques presented herein. The presenter device 110 includes a processor 22, network interface unit 23, display unit 24, keyboard/mouse 25, and audio speakers 26, each connected to a bus 27. Network interface unit 23 is a network interface card (NIC), for example, that enables network communications on behalf of the presenter device. Presenter device 110 includes a memory 28 that stores or is encoded with software for execution by processor 22 and stores data received and generated in the course of operation of the attendee device. Memory 28 may comprise read only memory (ROM), random access memory (RAM), magnetic disk storage media devices, optical storage media devices, flash memory devices, electrical, optical, or other physical/tangible memory storage devices. The processor 22 is, for example, a microprocessor or microcontroller that executes instructions for acquiring shared content in an online conference. Thus, in general, memory 28 may comprise one or more tangible (non-transitory) computer readable storage media (e.g., a memory device) encoded with software comprising computer executable instructions, and when the software is executed (by processor 22) it is operable to perform the operations described herein for presenter device 110.

In particular, memory 28 of presenter device 110 stores meeting client software 90. Meeting client software 90 includes a user interface module 92 and a magnification processing module 94. Meeting client software 90 enables the presenter device 120 to participate in an online meeting/conference and to share content (e.g., a desktop, application, document, etc.). User interface module 92 handles the presentation of the shared content at the presenter device 120, including graphical user interface elements, visual display of the shared content on display 24, and optionally output of audio on speakers 26. Magnification processing module 94 is responsible for performing operations at the presenter device 110 described below to respond to a request from an attendee device that specifies an area to be magnified by the presenter device and to generate and send the magnified image data sent back to the requesting attendee device.

Figure 3:
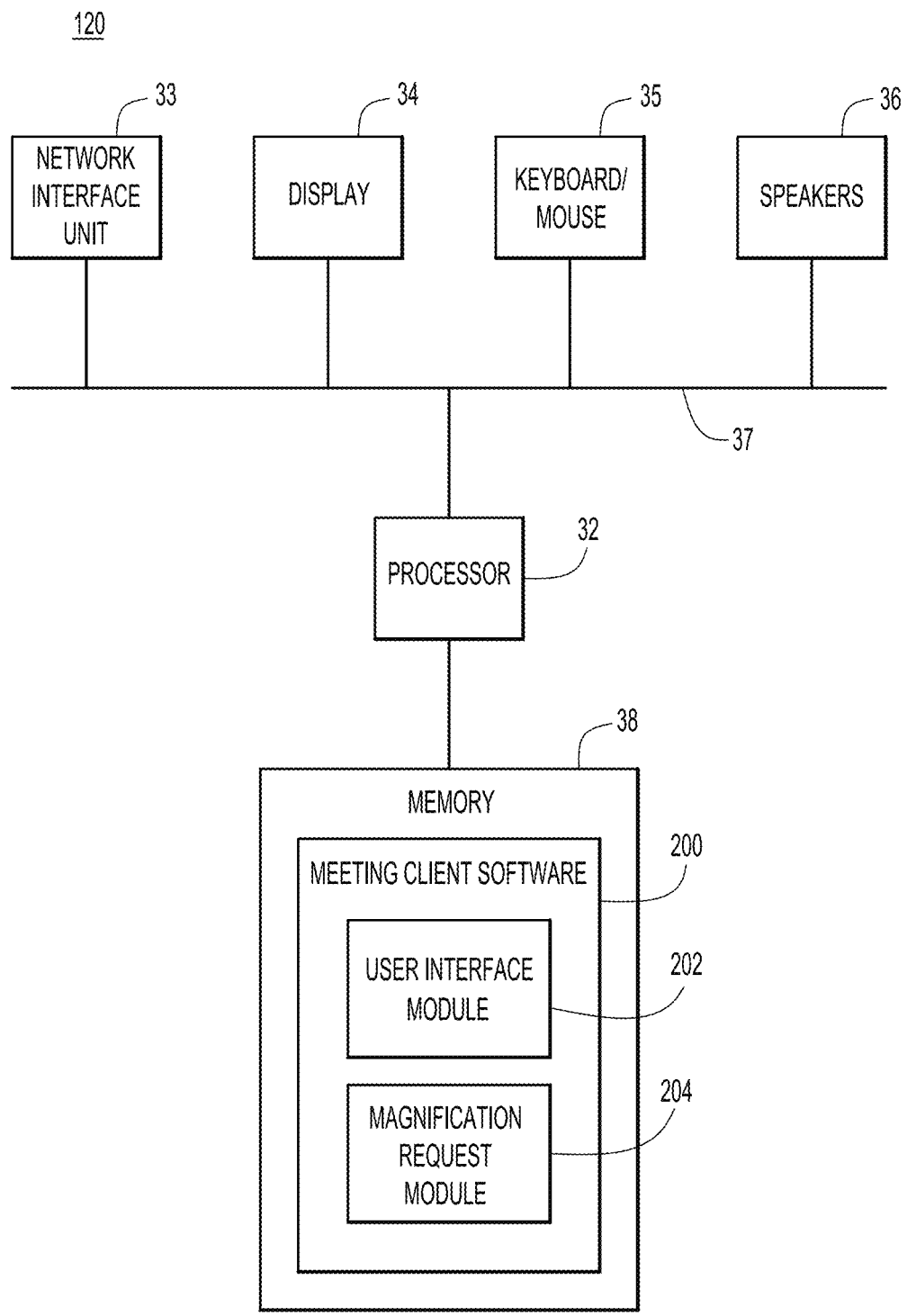
FIG. 3 is a block diagram of an example computing device configured to operate as an attendee device in the system of FIG. 1.

FIG. 3 shows a block diagram of an example attendee device 120 configured to operate according to the techniques presented herein. The attendee device 120 includes a processor 32, network interface unit 33, display unit 34, keyboard/mouse 35, and audio speakers 36, each connected to a bus 37. Network interface unit 33 is a NIC, for example, that enables network communications on behalf of the attendee device. Attendee device 120 includes a memory 38 that stores or is encoded with software for execution by processor 32 and stores data received and generated in the course of operation of the attendee device. Memory 38 take on forms similar to that for presenter device 110 described above in connection with FIG. 2. The processor 32 is, for example, a microprocessor or microcontroller that executes instructions for acquiring shared content in an online conference. Thus, in general, memory 38 may comprise one or more tangible (non-transitory) computer readable storage media (e.g., a memory device) encoded with software comprising computer executable instructions, and when the software is executed (by processor 32) it is operable to perform the operations described herein for attendee device 120.

In particular, memory 38 of attendee device 120 stores meeting client software 200. Meeting client software 200 includes a user interface module 202 and a magnification request module 204. Meeting client software 200 enables the attendee device 120 to participate in an online meeting/conference in which a host device shares content (e.g., a desktop, application, document, etc.). User interface module 202 handles the presentation of the shared content at the attendee device 120, including graphical user interface elements, visual display of the shared content on display 34, and optionally output of audio on speakers 36. Magnification request module 204 is responsible for handling operations at the attendee device 120 described below to allow an attendee to specify an area to be magnified by the presenter device and have the magnified image data for the specified area or region sent back to the requesting attendee device.

Figure 4:
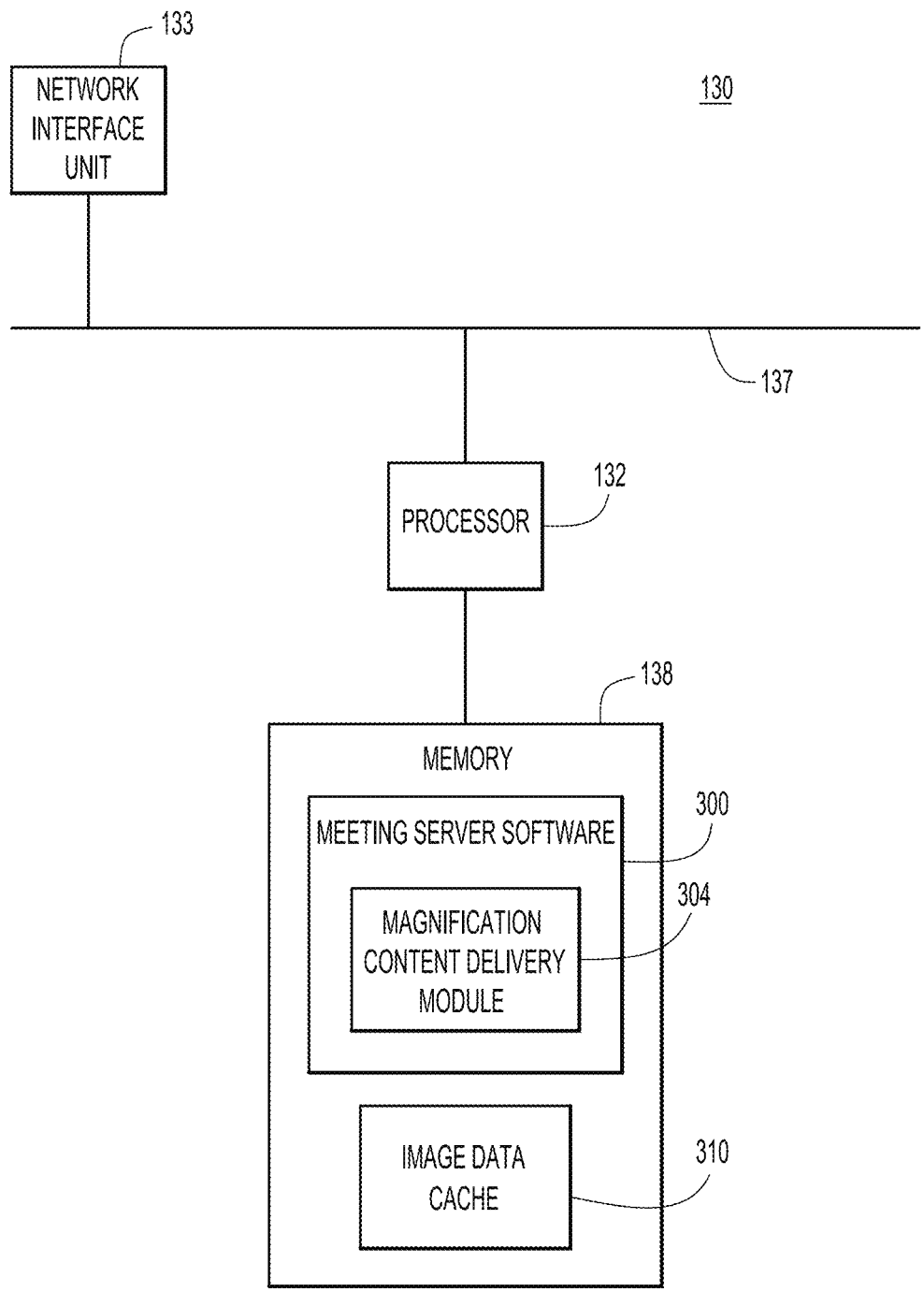
FIG. 4 is a block diagram of an example computing device configured to operate as a server in the system of FIG. 1.

FIG. 4 shows a block diagram of an example server 130 that may participate in the techniques presented herein. Server 130 may be implemented by a computer system in a similar manner as an endpoint device. For example, server 130 includes a processor 132 and network interface unit 133, each connected to a bus 137. Server 130 also includes a memory 138 that stores or is encoded with software for execution by processor 132 and stores data received and generated in the course of operation of the server as described herein. In particular, memory 138 of server 130 stores meeting server software 300 and includes image data cache 310. The image data cache 310 stores image data passed between the presenter device 110 and one or more attendee devices 120. Meeting server software 300 enables the server 130 to deliver shared content from the host to attendee endpoints in an online conference/meeting. The meeting server software 300 includes a magnification content delivery module 304 to relay requests from an attendee device for magnified image data corresponding to a region of the shared content.

Figure 5A:
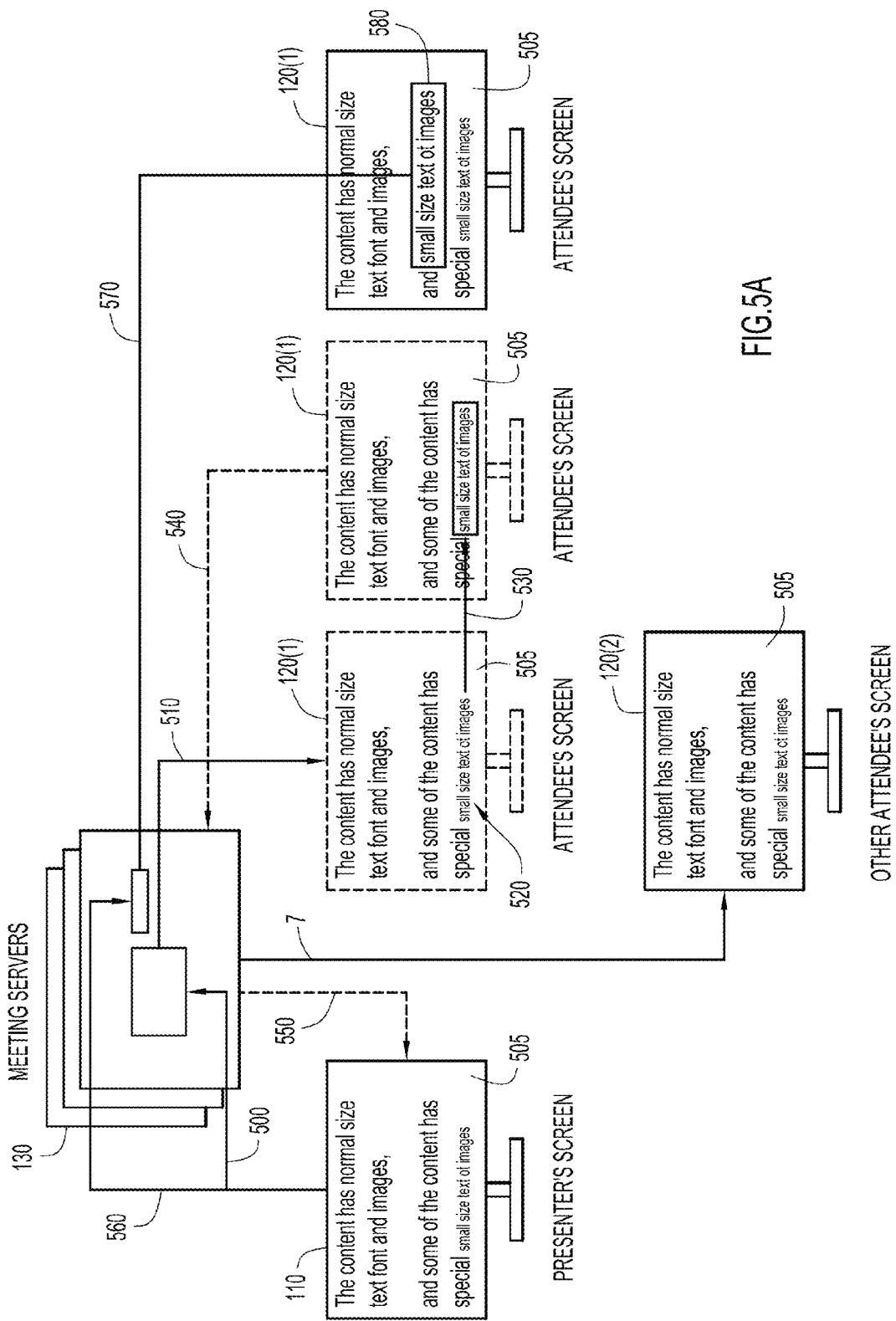
FIG. 5A is a diagram depicting a high-level operational flow in the system of FIG. 1, according to an example embodiment.

As explained above, the techniques presented herein allow a presenter device to automatically magnify a region of interest selected by an attendee at an attendee device. Reference is now made to FIG. 5A. FIG. 5A illustrates a high level flow for a process to magnify and optimize shared content for an on-demand zoom in request. In FIG. 5A, the meeting server(s) 130 is shown, along with the display screens of the presenter device 110, a first attendee device 120(1) and a second attendee device 120(2). For simplicity, the screens of the presenter device, and first and second attendee devices are referred to by the reference numerals 110, 120(1) and 120(2), respectively.

At 500, the presenter device shares application or desktop content shown at 505. At 510, the attendees see the shared content. That is, the display screen for attendee device 120(1) displays the content 505. At 520, the attendee at attendee device 120(1) finds some part of the shared content too small to see. At 530, the attendee at attendee device 120(1) enters the zoom mode, selects the region to be magnified/zoomed-in and sends a magnification request/notification at 540. Selection of the region to be magnified may be made by a mouse function, a touch-screen function, touch-pad function, or any other suitable user interface mechanism now known or hereinafter developed.

At 550, the meeting server 130 receives the request, and relays it to the presenter device 110. For reasons that will become apparent hereinafter, the server 130 stores/caches the request so that it knows the parameters describing the region that the attendee at attendee device 120(1) requested to be magnified. The presenter device 110 receives the magnification request and using the uncompressed image data that the presenter device 110 has (because it is the source of the shared content), the presenter device 110 automatically magnifies the selected/particular region to generate image data (uncompressed and magnified) for the selected region (identified in the magnification request). At 560, the presenter device sends the image data for the selected region to the meeting server 130, in which in turn forwards it to the presenter device for display at 570. The magnified region is shown at 580 on the screen of attendee device 120(1). The attendee at attendee device 120(1) can mouse scroll down to enlarge that region further, and hit a command, such as the "Esc" key to exit a mode that displays the magnified region 580.

The techniques depicted in FIG. 5A allow an attendee to customize what he/she wants to magnify. The entire picture for the area that the attendee wants to be magnified is displayed, not just one word or a portion of the graphical elements in that section, but all of the words of that section or the entirety of the graphical elements. In prior techniques, only a small portion of a section (e.g., a line of text) may be zoomed, and the attendee is required to move a cursor or other "zooming" graphical element across the line, requiring further requests to be sent to the meeting server to retrieve additional sections of the section for magnification. This is inefficient, and the techniques allow for an entire section to be magnified with one request back to the presenter or the meeting server. When an attendee is viewing the shared content, if the content is still not large enough, he/she can request further zooming/magnification, which is not possible with prior techniques.

As shown at 120(2) the shared content displayed on other attendee devices is kept in original form if they do not sent zoom in requests. If multiple attendees have sent zoom in requests to the presenter device, an optimization process is invoked, as described further hereinafter.

Furthermore, as depicted in FIG. 5A, once the presenter receives the request from the attendee (for a magnified region of the presented content) and maps the region contained in the request to the presenter's screen, and then the presenter device can capture the requested area. There are two possibilities: the requested area is text or graphics content. The presenter device can utilize optical character recognition (OCR) technology if it determines that the requested area is text related.

If the requested area is text related, the presenter device will generate the text content and send it to the meeting server. This allows the attendee device to display the content in any zoom percentage/magnification. Conversely, a higher resolution image can be generated by the presenter device (but not sent to the meeting server at that time). If the attendee device requests an image type view (as opposed to a text view), the presenter device can send the image data to the meeting server, and the meeting server sends it on to the attendee device.

If the requested area is not text related, the presenter device captures the requested data at a higher resolution and sends it to the meeting server, to be sent to the attendee device.

Figure 5B:
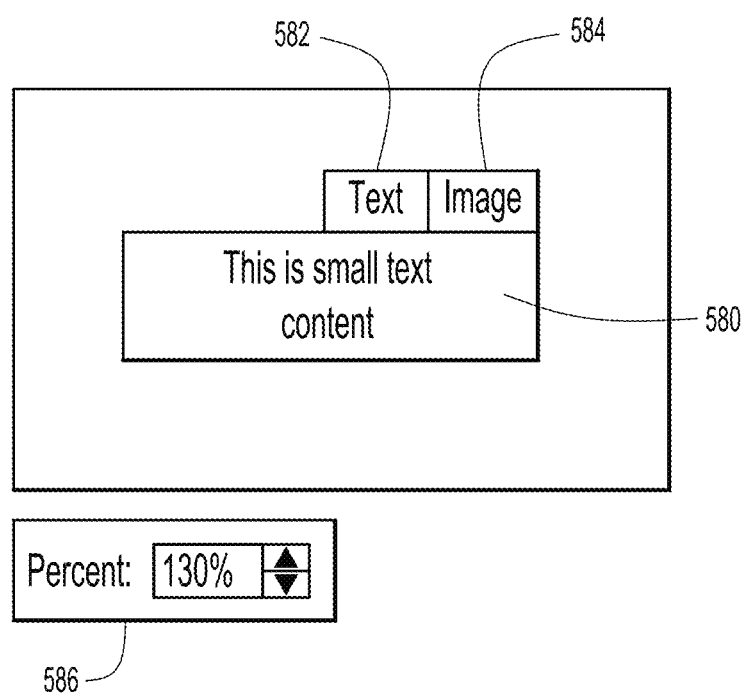
FIG. 5B is diagram illustrating an example of a user interface at an attendee device to allow an attendee to select a magnification percentage, according to an example embodiment.

As shown in FIG. 5B, the attendee can select text or image to see the magnified content. The magnified content is shown at reference numeral 580, continuing with the example from FIG. 5A. The attendee can also resize the window to view in any zoom rate, and this zoom is done locally at the attendee device with the data received from the presenter device (via the meeting server). There is a Text tab 582 and an Image tab 584 or other similar graphical control elements that allow the user to switch/select between text display format or image display format. If the requested area is text related, a Text tab 582 will be the default; otherwise, the default is Image. If the text mode is not want the attendee wants, the attendee can switch to the Image mode.

A zoom percentage control graphical element is shown at 586. The attendee can select the zoom percentage desired (by typing the percentage into a window of the element 586 or using the up or down areas to select the percentage. The attendee device will increase the magnification (from locally stored data for the requested area).

Again, as explained above, if the requested region to be magnified is text, the presenter device determines this and captures text content instead of original image data. This will likely occur more frequently than graphical image data because most often an attendee will not be able to read text because it is too small on the attendee device. The presenter device uses OCR techniques to obtain the text content and sends the text content to the server, which forwards it to the attendee device. This technique places little burden on the server (because text data can be transmitted and cached with less data that image content, and this allows the attendee device to magnify the text to any percentage, selectable by the attendee.

To summarize, the presenter device determines whether the particular region requested to be magnified contains (solely) text. When it is determined that the particular region contains text, the presenter device, using OCR or other similar techniques, converts the text in the particular region to text data, and then sends the text data (as the magnified image data) to the requesting attendee device (via the meeting server).

Moreover, from the perspective of an attendee device having local magnification capabilities, a method is provided in which the attendee device sends a request including information indicating a particular region of shared content being presented by a presenter device during the online meeting selected to be magnified at the attendee device. The attendee device receives the magnified image data for the first particular region based on the information contained in the request. The attendee device stores the magnified image data. Then, the attendee device receives a command from a user at the attendee device, the command to cause a change in magnification of the stored magnified image data. The attendee device displays the magnified image data in accordance with the command using the magnified image data stored at the attendee device (without the need to go back to the meeting server or presenter device to obtain updated magnified or uncompressed image data).

Figure 6B:
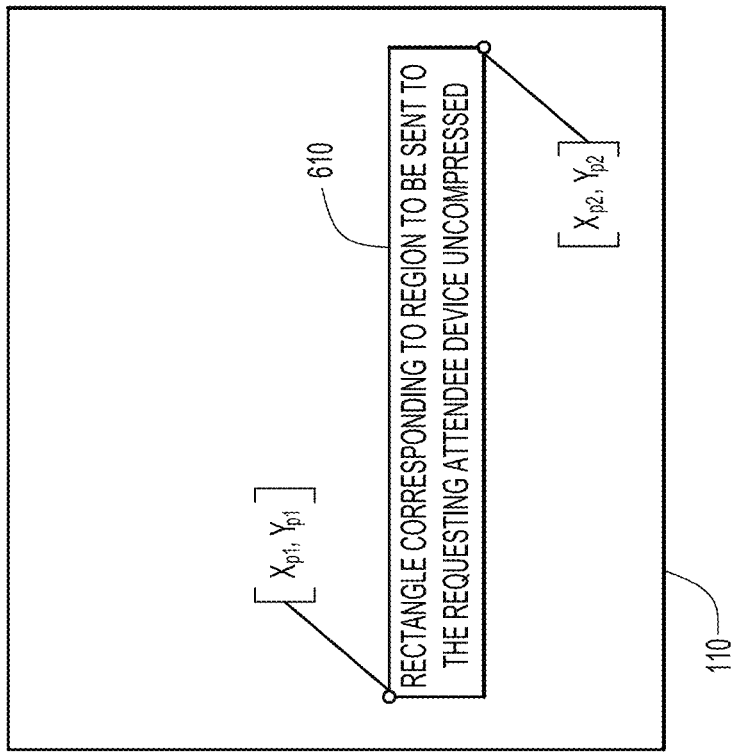
FIGS. 6A and 6B are diagrams illustrating how requests describing regions of shared content to be magnified are processed, according to an example embodiment.
Figure 6A:
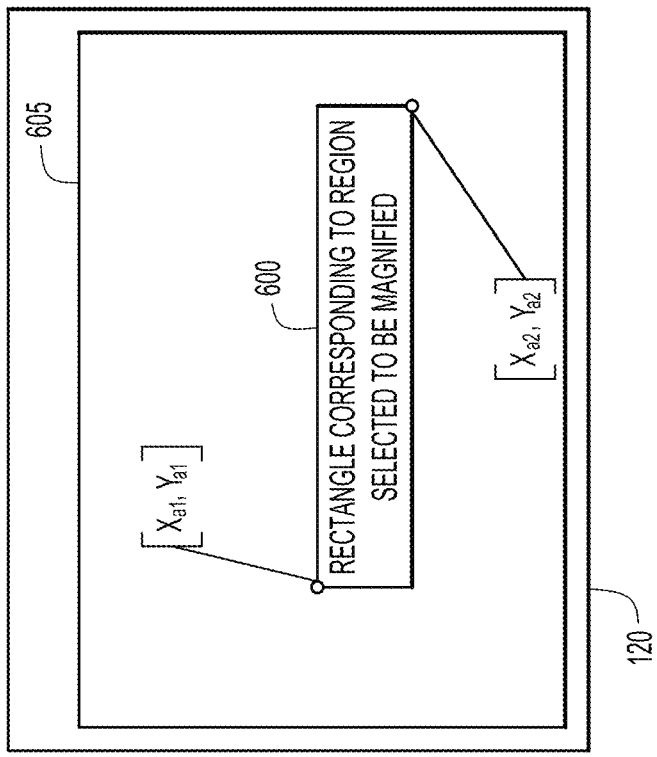

Reference is now made to FIGS. 6A and 6B. FIG. 6A shows the display screen for attendee device 120. A rectangle 600 is defined that corresponds to the region within a conference window 605 that the attendee requests to be magnified. FIG. 6B shows the display screen for the presenter device 110 and the rectangular region 610 on the presenter device screen corresponding to region 600 that is selected to be magnified (sent to the attendee device without compression).

For this example, the following is assumed:

The screen resolution of the presenter device 110 is $Xp*Yp$

The screen resolution of the attendee device 120 is $Xa*Ya$

If the X dimension of the screen resolution for the presenter device is greater than or equal to that for the attendee device (i.e., $Xp >= Xa$), then $Xp1 = Xp/Xa*Xa1$ $Yp1 = Xp/Xa*Ya1$ :

Xp2=Xp/Xa*Xa2
Yp2=Xp/Xa*Ya2

Said another way, when the screen resolution of the presenter device 110 is greater than or equal to the screen resolution of the attendee device 120, generating the magnified image data for the particular region includes converting the coordinates describing boundaries of the particular region (for which a magnification request is sent) with respect to the screen resolution of the attendee device to coordinates describing boundaries of the particular region with respect to the screen solution of the presenter device 110 based on a ratio of the screen resolution of the presenter device to the screen resolution of the attendee device, i.e., Xp/Xa.

Conversely, if Xp<Xa, then:
Xp1=Xa1
Yp1=Ya1
Xp2=Xa2
Yp2=Ya2

In this example, Xa1,Ya1, Xa2,Ya2 is the pixel position relative to top left corner of conference window, and Xp1, Yp1, Xp2,Yp2 is the pixel position relative to top left corner of presenter device's screen.

Said another way, when the screen resolution of the presenter device 110 is less than the screen resolution of the attendee device 120, generating the magnified image data for the particular region includes setting coordinates describing boundaries of the particular region with respect to the screen resolution of the presenter device 110 equal to the coordinates describing boundaries of the particular region with respect to the screen resolution of the attendee device 120.

Figure 7:
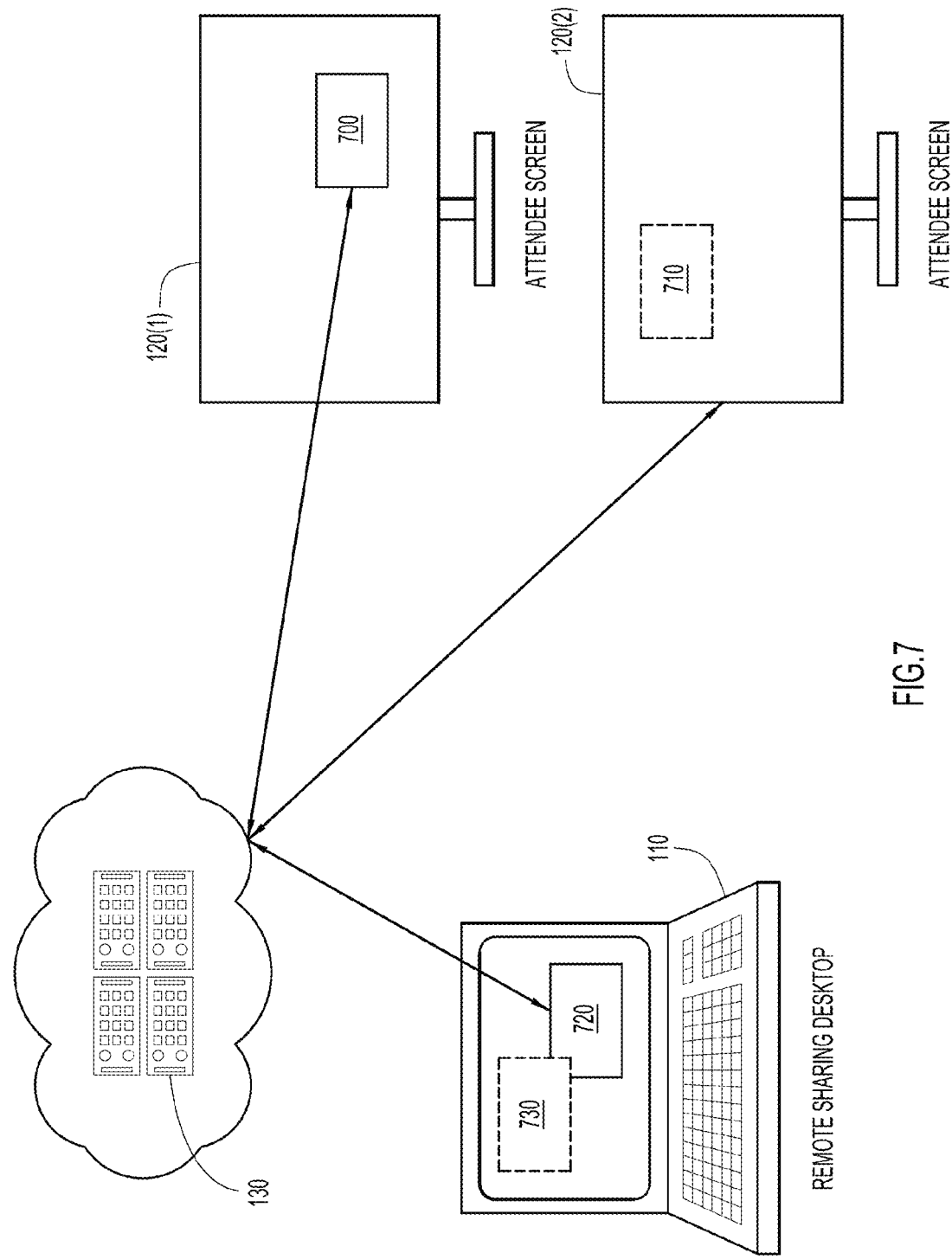
FIG. 7 is a diagram depicting an operational flow in the system of FIG. 1 when multiple requests are received for magnified image data for multiple regions of the shared content, according to an example embodiment.

Reference is now made to FIG. 7 in which the display screens of two attendee devices 120(1) and 120(2) are shown. At 700, an attendee at attendee device 120(1) selects a region to be magnified. At 710, an attendee at attendee device 120(2) selects a different region to be magnified. The meeting server 130 relays these requests to the presenter device 120. The presenter device 120 generates the zoomed-in (uncompressed/magnified) image data for regions 700 and 710, shown at reference numerals 720 and 730, respectively, and sends the magnified image data to the attendee devices 120(1) and 120(2) by way of the meeting server 130.

There may be a performance issues if different attendees request different magnified regions. This can place a heavy load on the meeting server 130 and the presenter device 110.

Figure 8C:
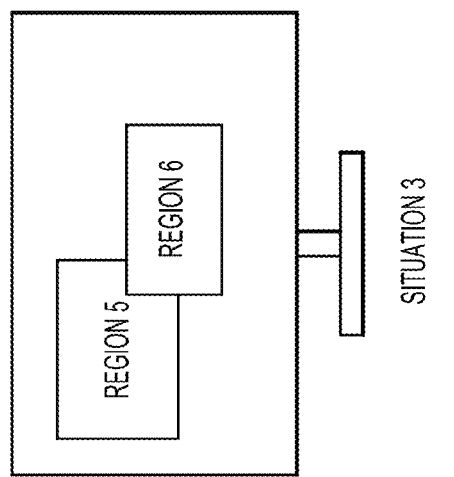
FIGS. 8A, 8B and 8C are diagrams illustrating examples of scenarios for multiple requests of magnified image data for multiple regions of the shared content, according to an example embodiment.
Figure 8B:
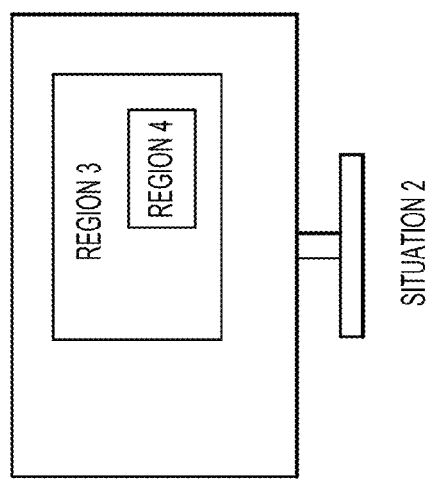
Figure 8A:
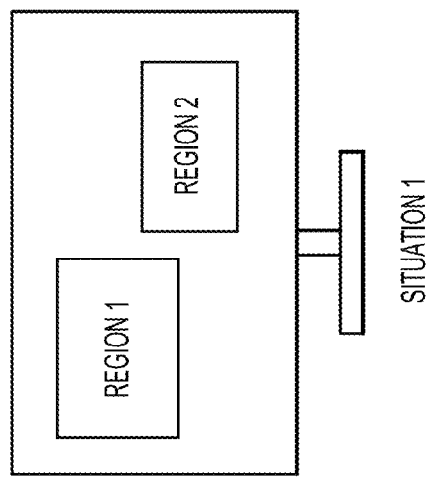

Reference is now made to FIGS. 8A, 8B and 8C, which illustrate different scenarios when different regions are requested to be magnified by different attendee devices. FIG. 8A illustrates Situation 1 in which the attendee request regions are not overlapping. FIG. 8B illustrates Situation 2 in which the requested are contained within one another. FIG. 8C illustrates Situation 3 where the regions partially overlap with each other.

For Situation1, when the presenter device receives the attendees' requests, the presenter device will send the magnified image data for the two different regions (Region1, Region2) to the respective attendee devices.

For Situation2, when the presenter device receives the attendees' requests, it only sends uncompressed image data for Region 3 to the meeting server. The meeting server can generate the magnified image data for Region 4 from the uncompressed image data for Region 3, and sends the uncompressed/magnified image data for Region 4 to the appropriate attendee. Thus, the meeting server in this situation will cache the uncompressed image data for Region 3, forward the magnified image data for Region 3 to the requesting attendee for that region, and compose the magnified image data for Region 4 (by cropping the uncompressed image data for Region 3 to the area needed for Region 4) and send the magnified image data for Region 4 to the attendee device that requested Region 4.

When different attendees request different regions to be magnified, and those regions partially overlap (as shown in FIG. 8C), the solution depicted in FIG. 9 is employed. At 900, the requested regions are received at the presenter device. At 910, the presenter device appends blank areas, such as Region 7 and Region 8, to Regions 5 and 6 to form one integrated or synthesized region, Region 9, (having a more regular shape) as shown at 910. The presenter device sends uncompressed image data for Region 9 to the meeting server. The meeting server generates Region 5 and Region 6 from the image data for Region 9, sends the image data for Region 5 to the first requesting attendee device and sends image data for Region 6 to the second requesting attendee device. Since all of the requests from attendee devices go through meeting server, the meeting server maintains a fresh copy of sharing image data. If the uncompressed image data for the attendee requested region has been stored at the meeting server, the meeting server can directly send the magnified image data to the requesting attendee device.

Again, said another way, at least a first request from a first attendee device and a second request from a second attendee device are received. The first request includes information indicating a first particular region of shared content being presented during the online meeting to be magnified at the first attendee device, and the second request includes information indicating a second particular region of shared content being presented during the online meeting to be magnified at the second attendee device. Magnified image data may be generated for the first particular region based on information contained in the first request, and magnified image data for the second request is separately generated for the second particular region based on information contained in the second request. The magnified image data for the first particular region is sent to the first attendee device and the magnified image data for the second particular region is sent to the second attendee device.

However, it is possible that the first particular region and the second particular region (and other regions based on requests received from still further attendee devices) may overlap. It is useful to determine whether there is any overlap between the first particular region and the second particular region (and other regions if other requests are pending). When it is determined that either of the first particular region or second particular region is entirely contained within the other, the magnified image data for a larger of the first particular region and second particular region is first generated, and the magnified image data for a smaller of the first particular region and the second particular region is composed by cropping the magnified image data for the larger of the first particular region and the second particular region.

When it is determined that the first particular region and the second particular region partially overlap, uncompressed image data is generated for an integrated region that includes the first particular region and the second particular region as well as one or more blank regions in order to fill out a regularly shaped region. The uncompressed image data for the integrated region is sent from the presenter device to the meeting server. The meeting server generates magnified image data for the first particular region and magnified image data for the second particular region from the uncompressed image data for the integrated region based on the information indicating the first particular region contained in the first request and the information indicating the second particular region contained in the second request. The server then sends/forwards the magnified image data for the first particular region to the first attendee device and sends/forwards the magnified image data for the second particular region to the second attendee device.

Figure 10:
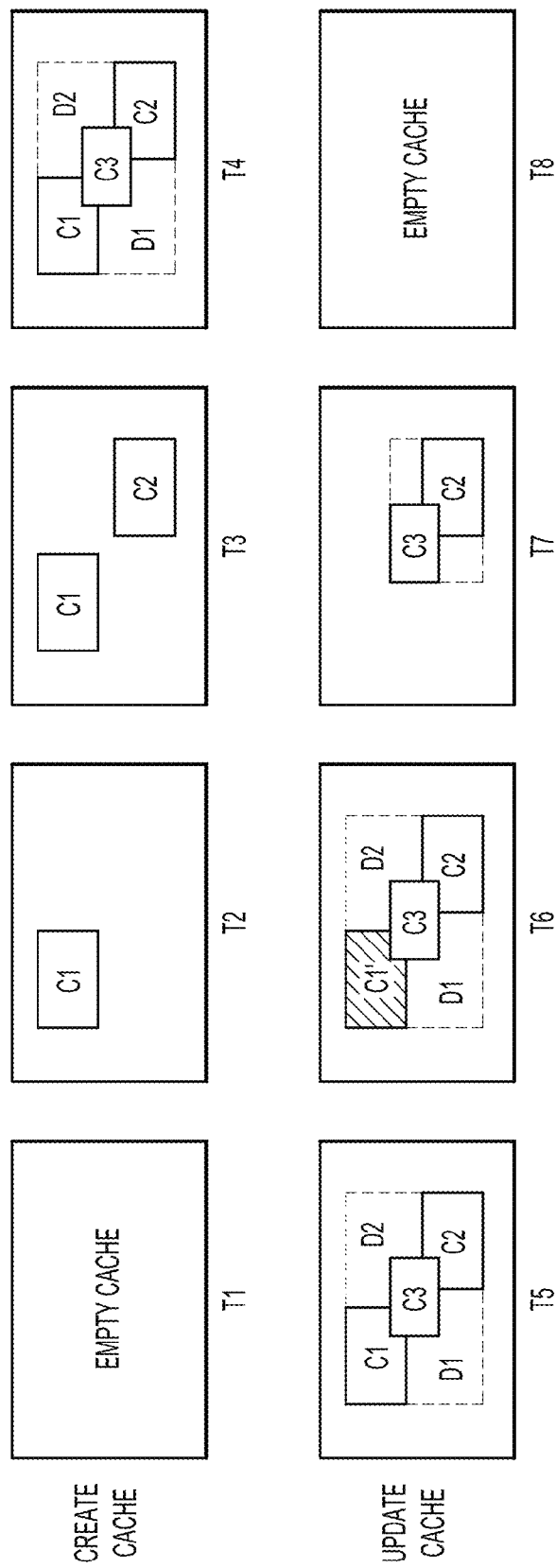
FIG. 10 is a diagram illustrating how a magnification cache at the meeting server is updated over time based as different regions are requested for magnification by different attendees during a meeting, according to an example embodiment.

Reference is now made to FIG. 10. According to another aspect of the techniques presented herein, there is a magnification cache at the meeting server 130 and a mechanism to manage the creation, update, and deletion of the magnification cache. There is no additional hardware cost. It is supported by software at the meeting server 130. In FIG. 10, the rectangle above T1-T8 represents the content of the presenter's screen, CN is the attendee requested magnified region, and TM represents the cache at the meeting server at time M.

Creating the Magnification Cache:

T1—When meeting is started, the magnification cache is initially empty.

T2—When attendee 1 requests to magnify a region at region C1, the meeting server will maintain data for C1 in the magnification cache.

T3—Another attendee, attendee 2 requests to magnify region C2. The cache now contains data for C1 and C2.

T4—Attendee 3 request to magnify region C3. Region C3 overlaps regions C1 and C2. Similar to that described above in connection with FIG. 9, regions C1, C2 and C3 are combined with regions D1 and D2 that are adjacent to region regions C1 and C2 respectively, to form a regular polygonal integrated region with regions C1 and C2, e.g., in the shape of a rectangle or square, for example. The meeting server will obtain the image data for regions D1 and D2 from the presenter device and combined into one region. If the regions C1-C3 are associated with text, it is very likely that numerous requests from different attendee devices will be made for magnification of those regions. It is therefore simpler for the meeting server to cache the integrated region as shown at T4.

Updating the Magnification Cache:

T5—Same status as T4.

T6—Region C1' is the updated shared content of the presenter. That region is marked invalid because it is not current to what is being presented by the presenter.

T7—Since region C1' is invalid, the meeting server combines regions C2 and C3 are combined into one smaller integrated region in the cache, and region C1' is deleted from the cache.

T8—If the presenter's desktop changed or the presenter sharing during the meeting is stopped, the cache will be destroyed or emptied.

Figure 11:
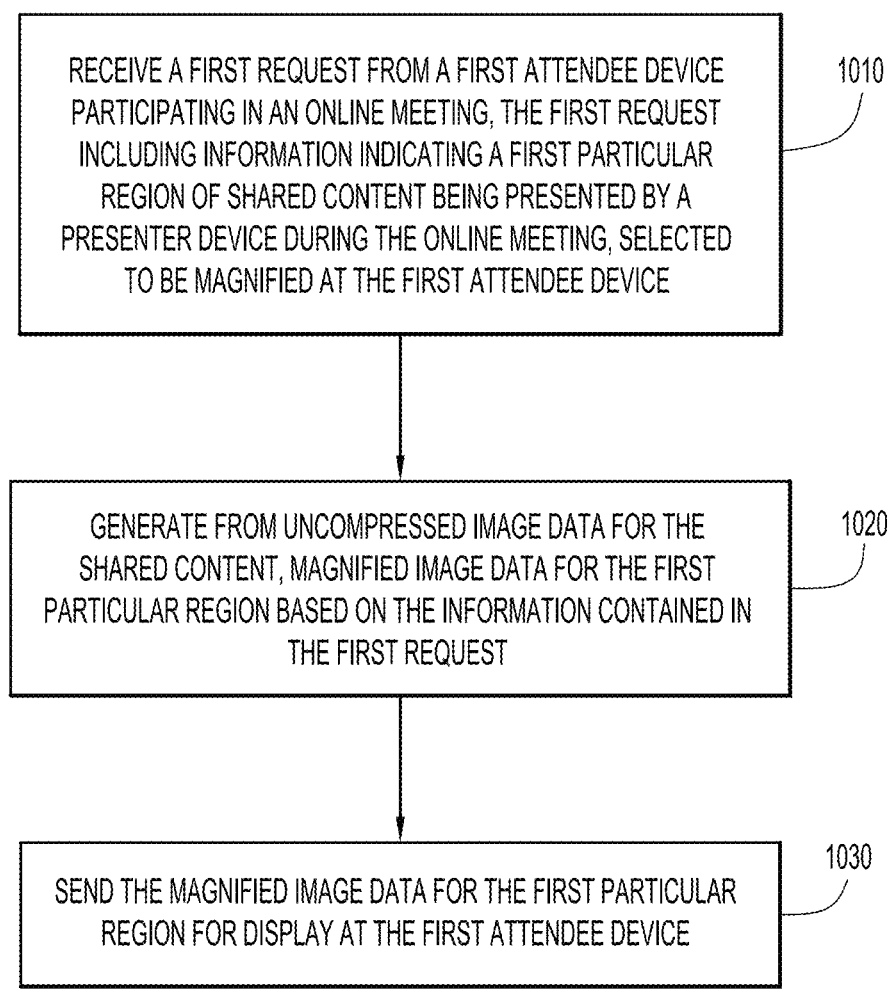
FIG. 11 is a flow chart illustrating operations performed according to the concepts presented in FIGS. 1-10, in accordance with example embodiments.

Reference is now made to FIG. 11. FIG. 11 illustrates a flow chart for a method 1000 according to an embodiment. At 1010, a first request is received from a first attendee device participating in an online meeting. The first request includes information indicating (describing) a first particular region of shared content being presented by a presenter device during the online meeting, selected to be magnified at the first attendee device. The selection of the first particular region is made by an attendee at the first attendee device. At 1020, magnified image data for the first particular region is generated from uncompressed image data for the shared data based on the information contained in the first request. At 1030, the magnified image data for the first particular region is sent for display at the first attendee device.

As described above in connection with FIG. 5A, the first request may be sent by the first attendee device and received at a server, e.g., a meeting server. The meeting server sends the first request on to the presenter device. In this case, the operation 1020 of generating the magnified image data is performed by the presenter device with the uncompressed image data at the presenter device (which is the origin or source of the shared content). The presenter device then sends the magnified image data to the server which in turn sends the magnified image data to the first attendee device.

As described above in connection with FIGS. 6A and 6B, generating the magnified image data for the first particular region may be based on a screen resolution at the first attendee device and a screen resolution at the presenter device. To this end, the first request includes coordinates describing boundaries of the first particular region with respect to the screen resolution of the first attendee device. When the screen resolution of the presenter device is greater than or equal to the screen resolution of the first attendee device, generating the magnified image data for the first particular region includes converting the coordinates describing boundaries of the first particular region with respect to the screen resolution of the first attendee device to coordinates describing boundaries of the first particular region with respect to the screen solution of the presenter device based on a ratio of the screen resolution of the presenter device to the screen resolution of the first attendee device. Conversely, when the screen resolution of the presenter device is less than the screen resolution of the first attendee device, generating the magnified image data for the first particular region includes setting coordinates describing boundaries of the first particular region with respect to the screen resolution of the presenter device equal to the coordinates describing boundaries of the first particular region with respect to the screen resolution of the first attendee device.

The techniques presented herein allow an attendee to request a magnified part of shared content and the presenter to employ optimized methods to provide the magnified part of the shared content. At the attendee device, what is to be magnified totally depends on user's desires/demands. If one attendee has requested magnified image data for a portion of shared content, it may solve the needs of other attendees because most attendees will encounter similar issues in viewing shared content. The first attendee device that requests a magnification of a region will result in the magnified data for that requested being cached at the meeting server (after it is transmitted from the presenter device). The presenter device need only handle requests sent by attendees, and need only upload magnified data for the part of shared content that an attendee as requested.

In accordance with one aspect, a method is provided comprising: receiving a first request from a first attendee device participating in an online meeting, the first request including information indicating a first particular region of shared content being presented by a presenter device during the online meeting selected to be magnified at the first attendee device; generating from uncompressed image data for the shared content, magnified image data for the first particular region based on the information contained in the first request; and sending the magnified image data for the first particular region for display at the first attendee device.

Similarly, one or more computer readable storage media encoded with software comprising computer executable instructions and when the software is executed by a processor, it is operable to: receive a first request from a first attendee device participating in an online meeting, the first request including information indicating a first particular region of shared content being presented by a presenter device during the online meeting selected to be magnified at the first attendee device; generate from uncompressed image data for the shared content, magnified image data for the first particular region based on the information contained in the first request; and cause the magnified image data for the first particular region to be sent for display at the first attendee device.

Further, an apparatus is provided comprising a network interface unit configured to enable communications over a network; a processor coupled to the network interface unit, wherein the processor: obtains a first request received via the network interface unit from a first attendee device participating in an online meeting, the first request including information indicating a first particular region of shared content being presented by a presenter device during the online meeting selected to be magnified at the first attendee device; generates from uncompressed image data for the shared content, magnified image data for the first particular region based on the information contained in the first request; and causes the magnified image data for the first particular region to be sent for display at the first attendee device.

In accordance with another embodiment, a method is provided comprising: sending a request from an attendee device participating in an online meeting, the request including information indicating a particular region of shared content being presented by a presenter device during the online meeting selected to be magnified at the attendee device; receiving magnified image data for the particular region based on the information contained in the request; storing the magnified image data at the attendee device; receiving a command from a user at the attendee device to change the magnification of the magnified image data; and displaying the magnified image data in accordance with the command to change the magnification using the magnified image data stored at the attendee device.

The above description is intended by way of example only. Various modifications and structural changes may be made therein without departing from the scope of the concepts described herein and within the scope and range of equivalents of the claims.

What is claimed is:

1. A method comprising:
receiving, at a presenter device, a first request from a first attendee device participating in an online meeting, the first request being first received by a server, which in turn sends the first request to the presenter device, the first request including information indicating a first particular region of shared content being presented by the presenter device during the online meeting selected to be magnified at the first attendee device;
generating, at the presenter device, from uncompressed image data for the shared content, magnified image data for the first particular region based on the information contained in the first request; and
sending the magnified image data for the first particular region for display at the first attendee device to the server, which in turn sends the magnified image data to the first attendee device.

2. The method of claim 1, wherein generating the magnified image data for the first particular region is based on a screen resolution at the first attendee device and a screen resolution at the presenter device, and wherein the first request includes coordinates describing boundaries of the first particular region with respect to the screen resolution of the first attendee device.

3. The method of claim 2, wherein when the screen resolution of the presenter device is greater than or equal to the screen resolution of the first attendee device, generating the magnified image data for the first particular region includes converting the coordinates describing boundaries of the first particular region with respect to the screen resolution of the first attendee device to coordinates describing boundaries of the first particular region with respect to the screen solution of the presenter device based on a ratio of the screen resolution of the presenter device to the screen resolution of the first attendee device.

4. The method of claim 2, wherein when the screen resolution of the presenter device is less than the screen resolution of the first attendee device, generating the magnified image data for the first particular region includes setting coordinates describing boundaries of the first particular region with respect to the screen resolution of the presenter device equal to the coordinates describing boundaries of the first particular region with respect to the screen resolution of the first attendee device.

5. The method of claim 1, further comprising receiving a second request from a second attendee device participating in the online meeting, the second request including information indicating a second particular region of shared content being presented during the online meeting to be magnified at the second attendee device, wherein generating further comprises generating magnified image data for the second particular region based on the information contained in the first request, and sending comprises sending the magnified image data for the second particular region to the second attendee device.

6. The method of claim 5, further comprising determining whether there is any overlap between the first particular region and the second particular region.

7. The method of claim 6, when it is determined that either of the first particular region or second particular region is entirely within the other, generating comprises generating magnified image data for a larger of the first particular region and second particular region, and composing magnified image data for a smaller of the first particular region and the second particular region by cropping the magnified image data for the larger of the first particular region and the second particular region.

8. The method of claim 6, wherein receiving comprises receiving the first request and the second request at a server, and further comprising sending the first request and the second request to the presenter device, and when it is determined that the first particular region and the second particular region partially overlap, generating comprises generating at the presenter device uncompressed image data for an integrated region that includes the first particular region and the second particular region as well as one or more blank regions, and further comprising:
sending the uncompressed image data for the integrated region from the presenter device to the server; and
the server generating magnified image data for the first particular region and magnified image data for the second particular region from the uncompressed image data for the integrated region based on the information indicating the first particular region contained in the first request and the information indicating the second particular region contained in the second request.

9. The method of claim 1, further comprising:
   determining whether the first particular region contains text;
   when it is determined that the first particular region contains text, converting text in the particular region to text data;
   wherein sending comprises sending the text data as the magnified image data.

10. One or more computer readable storage media encoded with software comprising computer executable instructions and when the software is executed by a processor, it is operable to:
    receive, at a presenter device, a first request from a first attendee device participating in an online meeting, the first request being first received by a server, which in turn sends the first request to the presenter device, the first request including information indicating a first particular region of shared content being presented by the presenter device during the online meeting selected to be magnified at the first attendee device;
    generate, at the presenter device, from uncompressed image data for the shared content, magnified image data for the first particular region based on the information contained in the first request; and
    cause the magnified image data for the first particular region to be sent by the presenter device to the server, which in turn sends the magnified image data to the first attendee device for display at the first attendee device.

11. The computer readable storage media of claim 10, wherein the instructions operable to generate the magnified image data for the first particular region are based on a screen resolution at the first attendee device and a screen resolution at the presenter device, and wherein the first request includes coordinates describing boundaries of the first particular region with respect to the screen resolution of the first attendee device.

12. The computer readable storage media of claim 11, wherein when the screen resolution of the presenter device is greater than or equal to the screen resolution of the first attendee device, the instructions operable to generate the magnified image data for the first particular region include instructions operable to convert the coordinates describing boundaries of the first particular region with respect to the screen resolution of the first attendee device to coordinates describing boundaries of the first particular region with respect to the screen solution of the presenter device based on a ratio of the screen resolution of the presenter device to the screen resolution of the first attendee device.

13. The computer readable storage media of claim 11, wherein when the screen resolution of the presenter device is less than the screen resolution of the first attendee device, the instructions operable to generate the magnified image data for the first particular region include instructions operable to set coordinates describing boundaries of the first particular region with respect to the screen resolution of the presenter device equal to the coordinates describing boundaries of the first particular region with respect to the screen resolution of the first attendee device.

14. The computer readable storage media of claim 10, wherein the instructions operable to receive include instructions operable to receive a second request from a second attendee device participating in the online meeting, the second request including information indicating a second particular region of shared content being presented during the online meeting to be magnified at the second attendee device, and further including instructions operable to generate magnified image data for the second particular region based on the information contained in the first request, and cause the magnified image data for the second particular region to be sent for display at the second attendee device.

15. The computer readable storage media of claim 14, further comprising instructions operable to determine whether there is any overlap between the first particular region and the second particular region.

16. The computer readable storage media of claim 15, when it is determined that either of the first particular region or second particular region is entirely within the other, the instructions operable to generate include instructions operable to generate magnified image data for a larger of the first particular region and second particular region, and compose magnified image data for a smaller of the first particular region and the second particular region by cropping the magnified image data for the larger of the first particular region and the second particular region.

17. The computer readable storage media of claim 15, when it is determined that the first particular region and the second particular region partially overlap, the instructions operable to generate comprise instructions operable to generate uncompressed image data for an integrated region that includes the first particular region and the second particular region as well as one or more blank regions, generate magnified image data for the first particular region and magnified image data for the second particular region from the uncompressed image data for the integrated region based on the information indicating the first particular region contained in the first request and the information indicating the second particular region contained in the second request.

18. An apparatus comprising:
    a network interface unit configured to enable communications over a network;
    a processor coupled to the network interface unit, wherein the processor:
      obtains, at a presenter device, a first request received via the network interface unit from a first attendee device participating in an online meeting, the first request being first obtained by a server, which in turn sends the first request to the presenter device, the first request including information indicating a first particular region of shared content being presented by the presenter device during the online meeting selected to be magnified at the first attendee device;
      generates, from the presenter device, from uncompressed image data for the shared content, magnified image data for the first particular region based on the information contained in the first request; and
      causes the magnified image data for the first particular region to be sent by the presenter device to the server, which in turn sends the magnified image data to the first attendee device for display at the first attendee device.

19. The apparatus of claim 18, wherein the processor generates the magnified image data for the first particular region based on a screen resolution at the first attendee device and a screen resolution at the presenter device, and wherein the first request includes coordinates describing boundaries of the first particular region with respect to the screen resolution of the first attendee device.

20. The apparatus of claim 19, wherein when the screen resolution of the presenter device is greater than or equal to the screen resolution of the first attendee device, the processor generates the magnified image data for the first particular region by converting the coordinates describing boundaries of the first particular region with respect to the screen resolution of the first attendee device to coordinates describing boundaries of the first particular region with respect to the screen solution of the presenter device based on a ratio of the screen resolution of the presenter device to the screen resolution of the first attendee device.

21. The apparatus of claim 19, wherein when the screen resolution of the presenter device is less than the screen resolution of the first attendee device, the processor generates the magnified image data for the first particular region by setting coordinates describing boundaries of the first particular region with respect to the screen resolution of the presenter device equal to the coordinates describing boundaries of the first particular region with respect to the screen resolution of the first attendee device.

22. A method comprising:
   sending a request from an attendee device participating in an online meeting, the request including information indicating a particular region of shared content being presented by a presenter device during the online meeting selected to be magnified at the attendee device;
   receiving magnified image data for the particular region based on the information contained in the request;
   storing the magnified image data at the attendee device;
   receiving a command from a user at the attendee device to change the magnification of the magnified image data; and
   displaying the magnified image data in accordance with the command to change the magnification using the magnified image data stored at the attendee device.

23. The method of claim 22, wherein displaying comprises:
   displaying a graphical element configured to receive the command to change the magnification.

24. The method of claim 22, wherein the request further includes coordinates describing boundaries of the particular region with respect to a screen resolution of the attendee device.

* * * * *